INVENTORS
Harold O. Peterson
Bertram Trevor
BY
H.S. Grover
ATTORNEY

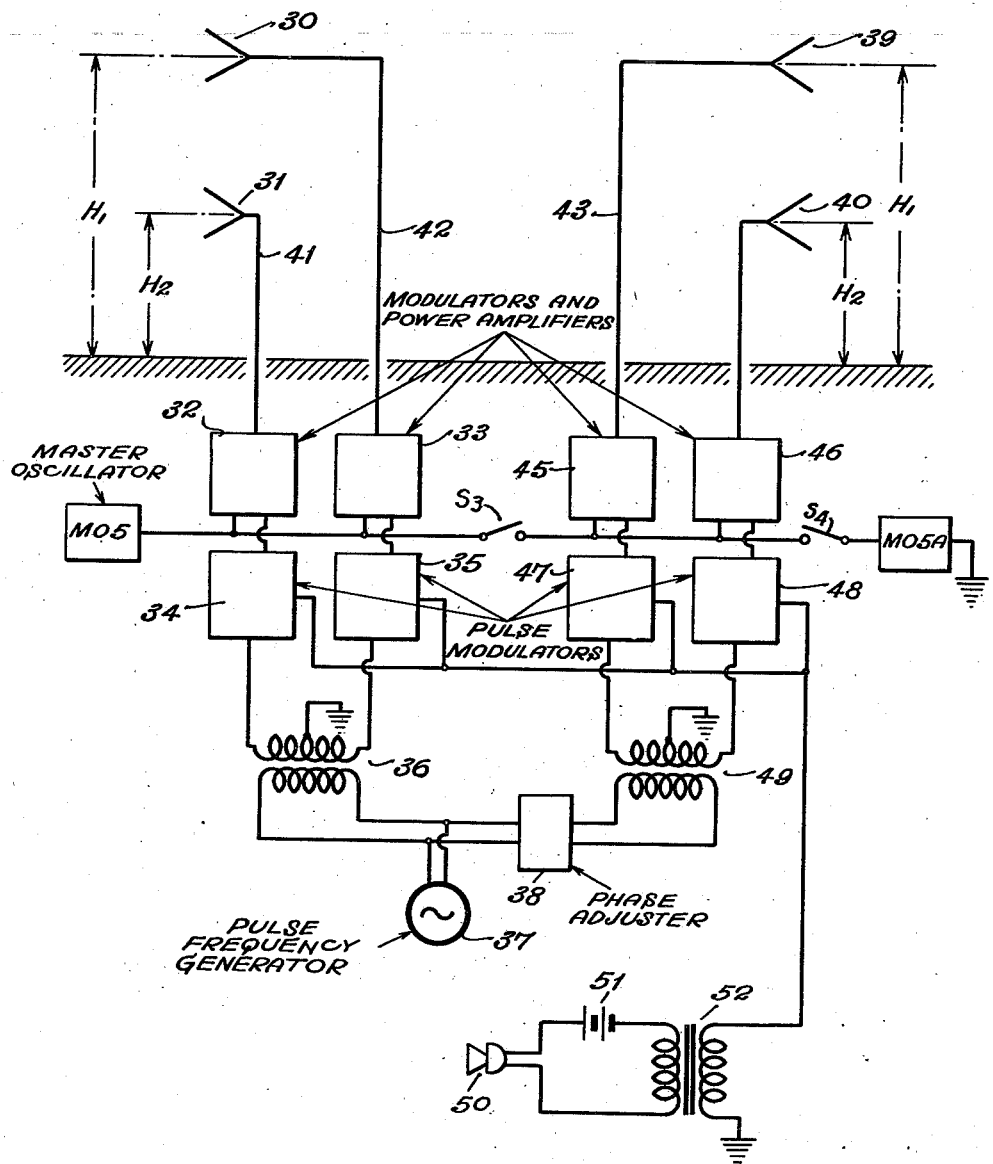

Patented Oct. 7, 1947

2,428,582

UNITED STATES PATENT OFFICE 2,428,582

RADIO DIVERSITY TRANSMITTER

Harold O. Peterson and Bertram Trevor, Riverhead, N. Y., assignors to Radio Corporation of America, a corporation of Delaware Original application May 21, 1942, Serial No. 443,932. Divided and this application May 7, 1943, Serial No. 486,010

9 Claims. (Cl. 250—17)

Our present invention relates to communication or signaling on ultra high frequency radio waves, and is a division of application Serial No. 443,932, filed May 21, 1942.

When signaling with ultra high frequency radio waves having, for example, a wave length of the order of ten centimeters or a frequency of the order of 3000 megacycles, it will be found that physical obstructions cast rather sharp shadows. This may be overcome by mounting the antenna well above the physical obstructions. However, since it may not be possible, desirable or practicable to locate a single omni-directional antenna above all nearby obstructions which cast such shadows, it is an object of our present invention to overcome this difficulty and to provide an omni-directional communication system for ultra short waves employing directive antennas, which system does not require unduly high supporting structures.

Figure 1:
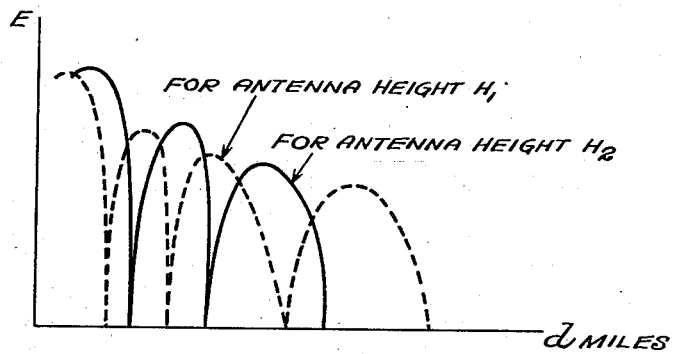

Also, as explained in our parent application Serial No. 443,932, filed May 21, 1942, when signaling with very short waves shadows or dead spots are caused by obstacles in the path of the transmitted waves. Similar dead spots are produced when short wave signals are transmitted from a considerable altitude as, for instance, from the mast of a ship. For example, consider two antennas of different heights H1 and H2 located on a tall mast of a ship. The voltage picked up from these two antennas at varying distances from the mast is roughly indicated in Figure 1 where the solid line would indicate the variations in signal strength from the antenna at a height H2 and the dotted line would indicate the variations in signal strength for the antenna at the height H1. The zones of low intensity illustrated in Figure 1 are produced by destructive interference between the direct ray and the ray reflected from the earth's surface which, in the case assumed, would be the surface of the water. The locations of the zones of low intensity depend upon the wave length and heights above ground of the transmitting and receiving antennas. In accordance with one aspect of our present invention, two antennas of different heights operating at the same or different frequencies are employed to substantially eliminate dead spots or zones of low intensity when signaling on very short waves of, for example, the order of 3000 megacycles.

Figure 2:
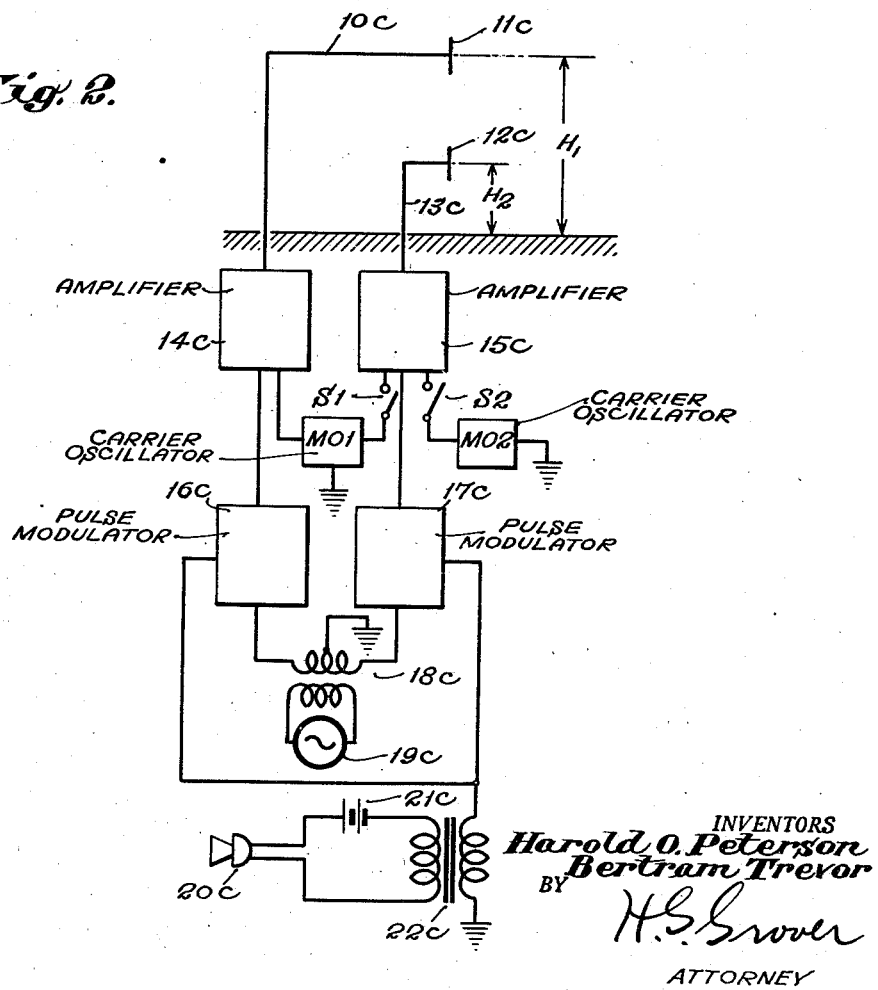

It should, therefore, be clear that one of the principal objects of our present invention is to provide improved ultra short wave systems and apparatus for overcoming zones of low signal intensity or "dead" spots. Further objects, advantages and features of our invention will be apparent as the more detailed description thereof proceeds. The latter will be given with the aid of the accompanying drawings wherein:

Figure 1 is a graph illustrating variations in zones of low intensity along the earth's surface for antennas of varying heights or for antennas operating on different wave lengths;

Figure 2 illustrates a transmitting arrangement for alternately exciting antennas of different heights so as to avoid the dead spots of Figure 1. It is to be noted in Figure 2 that the antennas may be excited with carrier energy of the same or different frequencies; and Figure 3 illustrates a modification of Figure 2 wherein pulses are radiated alternately from antennas at two different heights and in two directions. In connection with Figure 3 it is to be noted that all antennas may be operated on the same carrier frequency, or each pair of antennas may be operated at a different carrier frequency or, if desired, all of the antennas illustrated may each be operated on one of four different carrier frequencies.

A transmitting system for avoiding the loss of transmission due to the occurrence of these zones of weak signal strength is illustrated in Figure 2. The two antennas 11C and 12C are arranged at different heights so as to have displaced zones of low intensity as illustrated in Figure 1. That is to say, for example, antenna 11C may be adjusted at such a height as to have the characteristic illustrated by curve H1 of Figure 1 and antenna 12C may be adjusted to such a height as to have a characteristic illustrated by curve H2 of Figure 2 so that at all times within the range of the system a substantial signal is received from either or both of the transmitting antennas. The antennas are preferably omnidirectional and if placed on board ship may be of the type described in Figure 7 of the patent application of J. B. Atwood, Serial No. 441,659, filed May 4, 1942. The antennas 11C and 12C may, if desired, be directional over something more than 180 degrees and in this case they preferably are of the type described by J. B. Atwood in his copending application referred to and in particular in Figures 3 and 4 thereof. In this event, the antennas 11C and 12C of Figure 2 may be aimed in the same direction or in opposite directions. The antenna arrangement, as just described, may be used to good advantage at a receiving station. For details of such a receiving system reference is made to Figure 1A of our parent application.

Referring again to Figure 2, it will be noted that the transmitters or power amplifiers 14C and 15C radiate alternate pulses generated by the pulse generators under control of the pulse modulators 16C and 17C. The carrier frequency of the radiated pulses is that of the master oscillator MO1 when switch S1 is closed and switch S2 is open. When transmitting at different frequencies, switch S1 is left open and switch S2 is closed, in which event the frequency of radiation from antenna 11C is that of the master or carrier oscillator MO1 and the frequency of radiation from antenna 12C is different, then being, when switch S2 is closed, the frequency of operation of master oscillator MO2. The timing of the radiated pulses from antennas 11C and 12C is controlled by a wave of super-sonic frequency generated by oscillator 19C which is coupled differentially to the pulse modulators 16C and 17C through transformer 18C. The pulse modulators 16C and 17C are excited cophasally with modulation waves derived from microphone 20C and transformer 22C so that the pulse outputs of modulator 16C and 17C which at the frequency of the pulse oscillator 19C would vary in length or duration, as explained in greater detail in our parent application. It should be noted that the smallest significant signal element from the signal source 20C must be much greater in length than any individual pulse length generated by the pulse oscillator 19C.

Figure 3 shows a system whereby pulses are radiated alternately from antennas at two different heights and also in two different directions to avoid the interference of a local obstacle such as the supporting tower 10 of Figure 1 of our parent application Serial No. 443,932, filed May 21, 1942. In the system of Figure 3 antennas 30 and 31, supported at different heights H1 and H2, radiate in the same general direction. Antennas 39 and 40 are also supported at different heights H1 and H2 and are arranged to radiate in the opposite direction. If desired, antennas 39 and 40 may be arranged at heights respectively H3 and H4 which are different than the heights H1 and H2. The horizontal directivity of all of the antennas 30, 31, 39 and 40 may be made approximately 180 degrees wide if effective radiation is desired in all directions. In this event, each antenna may be made in the form illustrated in Figures 3 and 4 of the J. B. Atwood application hereinabove referred to.

Transmitters or radio frequency power amplifiers 32 and 33 radiate pulses alternately, the timing being controlled by waves of super-sonic frequency generated by oscillator 37 and fed through transformer 36 to the pulse modulators 34 and 35. The pulse modulators 34 and 35, as before explained, produce pulses of varying length, but of a frequency controlled by pulse generator 37.

Transmitters or power amplifiers 45 and 46 also radiate pulses alternately over the other antennas 39, 40, the timing being controlled by the same super-sonic oscillator 37 which, however, feeds the pulse modulators 47 and 48 through a phase adjusting network 38 and transformer 49. The phase adjuster 38 may be constructed in any known way and is adjusted so as to produce a phase change such that the pulses radiated by power amplifiers 45 and 46 will occur midway between the pulses radiated by transmitters or power amplifiers 32 and 33.

All of the pulses are modulated cophasally or simultaneously by waves picked up on microphone 50 and fed to all of the pulse modulators 34, 35, 47 and 48 through the secondary of transformer 52. The radio frequency carrier wave is supplied by a master oscillator MO5 which, when switch S3 is closed and S4 is open, supplies waves of the same frequency to each of the radio frequency transmitters, power amplifiers or modulators 32, 33, 45 and 46. When this is done, a simple receiver will receive signal energy at any distance and at any direction or height above ground within the range of the transmitters 32, 33, 45 and 46.

If desired, switch S3 may be opened and switch S4 closed, in which event the radiation from antennas 30 and 31 will be at a frequency controlled by the master oscillator MO5 and the radiation from antennas 39 and 40 will be at a different frequency corresponding to that derived from master oscillator MO5A. Or, if desired, a separate master oscillator, each operating at a different frequency, may be connected so as to supply the transmitters 32, 33, 45 and 46 so that the radiations from antennas 30, 31, 39 and 40 will be of different frequencies. Where radiation occurs at different frequencies several receivers feeding into a common modulation or signal output circuit should be provided each receiver having its radio frequency circuits tuned to a different one of the radiated frequencies.

As a further alternative, master oscillator MO5 may be used to control the radiation frequency of antenna 31 and antenna 39 and master oscillator MO5A may be used to supply radio frequency waves of a different frequency to antennas 30 and 40.

Having thus described our invention, what we claim is:

1. The method of reducing zones of low intensity when communicating on electro-magnetic wave energy of the order of ten centimeters in length which includes generating a plurality of such waves of different frequency, generating a signal wave in the form of a train of recurrent pulses of a predetermined frequency simultaneously modulating the generated waves with said train and alternately radiating the wave energies of different frequency from points of different altitude at a rate corresponding to the pulse frequency.

2. The method of signaling which includes generating a radio frequency carrier wave generating a signal wave in the form of a train of recurrent pulses of a predetermined frequency, modulating said carrier wave with said signal wave to obtain pulse modulated electromagnetic wave energy and alternately radiating the modulated carrier wave energy from points of different altitude at a rate corresponding to the pulse frequency.

3. In combination, a pair of omni-directional antennas arranged at the same geographical point but having different altitudes, a source of electro-magnetic wave energy modulated by a signal wave in the form of a train of recurrent pulses of a predetermined frequency, and instrumentalities for alternately feeding the pulse modulated wave energy to said antennas at a rate equal to the pulse frequency.

4. In combination, a pair of antennas arranged at different altitudes, a source of electro-magnetic wave energy modulated by a train of recurrent pulses of a predetermined frequency, and instrumentalities for alternately feeding the pulse modulated wave energy to said antennas at a rate equal to the pulse frequency.

5. In combination, a pair of antennas arranged at different altitudes, a source of electro-magnetic wave energy modulated by a train of recurrent pulses of a predetermined frequency, and instrumentalities for alternately exciting said antennas with said pulse modulated wave energy at pulse frequency.

6. Apparatus as claimed in the preceding claim, characterized by the fact that said antennas are omni-directional.

7. The method of signaling which includes generating a radio frequency carrier wave, generating a signal wave in the form of a train of recurrent pulses of a predetermined frequency, modulating said carrier wave with said signal wave to obtain pulse modulated electro-magnetic wave energy alternately radiating said modulated wave energy directively from a pair of points of different altitude at a rate corresponding to the pulse frequency, and then radiating the wave energy directively in an opposite direction from a second pair of points of different altitude.

8. The method which includes generating a radio frequency carrier wave, generating a signal wave in the form of a train of recurrent pulses of a predetermined frequency, modulating said carrier wave with said signal wave to obtain pulse modulated electro-magnetic wave energy, alternately directively radiating in one direction said pulse modulated electro-magnetic wave energy waves from a pair of vertically displaced points, alternately directively radiating in the opposite direction the same modulated wave energy from a second pair of vertically displaced points the rate of alternation being equal to the pulse rate.

9. The method which includes generating a radio frequency carrier wave, generating a signal wave in the form of a train of recurrent pulses of a predetermined frequency, modulating said carrier wave with said signal wave to obtain pulse modulated electro-magnetic wave energy and radiating the wave energy from two pairs of vertically displaced points, the radiation taking place cyclically at a rate determined by the pulse frequency.

HAROLD O. PETERSON.
BERTRAM TREVOR.

REFERENCES CITED

The following references are of record in the file of this patent:

UNITED STATES PATENTS

| Number | Name | Date |
|---|---|---|
| 2,186,554 | Perroux | Jan. 9, 1940 |
| 2,213,859 | Hahnemann | Sept. 3, 1940 |
| 2,242,910 | Hahnemann | May 20, 1921 |
| 2,294,882 | Alford | Sept. 8, 1942 |
| 2,297,228 | Kramar | Sept. 29, 1942 |
| 2,307,184 | Alford | Jan. 5, 1943 |
| 1,853,021 | Alexanderson | Apr. 12, 1932 |
| 1,463,994 | Hammond, Jr. | Aug. 7, 1923 |
| 2,159,647 | Alford | May 23, 1939 |
| 2,080,081 | Loth et al. | May 11, 1937 |
| 2,320,521 | Kear | June 1, 1943 |
| 2,095,774 | Taylor | Oct. 12, 1937 |
| 2,227,108 | Roosenstein | Dec. 31, 1940 |
| 2,328,944 | Beatty | Sept. 7, 1943 |
| 1,863,518 | Young | June 14, 1932 |
| 1,821,383 | Goldsmith | Sept. 1, 1931 |
| 2,262,838 | Deloraine et al. | Nov. 18, 1941 |
| 2,189,317 | Koch | Feb. 6, 1940 |
| 2,189,549 | Hershberger | Feb. 6, 1940 |
| 1,973,296 | Schroter | Sept. 11, 1934 |
| 2,290,692 | Lindenblad | July 21, 1942 |
| 2,033,271 | Aiken | Mar. 10, 1936 |

FOREIGN PATENTS

| Number | Country | Date |
|---|---|---|
| 540,233 | Great Britain | Oct. 9, 1941 |